United States Patent
Rehm et al.

(10) Patent No.: US 7,123,394 B2
(45) Date of Patent: Oct. 17, 2006

(54) SYSTEM AND METHOD FOR THE LASER BEAM DEFLECTION FOR OPTICAL MEASURING SYSTEMS

(75) Inventors: Wolfgang Rehm, Hergensweiler (DE); Guenter Reithmeier, Putzbrunn (DE); Paul Zeller, Munich (DE)

(73) Assignee: EADS Deutschland GmbH, Ottobrunn (DE)

( * ) Notice: Subject to any disclaimer, the term of this patent is extended or adjusted under 35 U.S.C. 154(b) by 109 days.

(21) Appl. No.: 11/020,116

(22) Filed: Dec. 27, 2004

(65) Prior Publication Data

US 2005/0225763 A1     Oct. 13, 2005

Related U.S. Application Data

(63) Continuation of application No. PCT/DE03/01893, filed on Jun. 7, 2003.

(30) Foreign Application Priority Data

Jun. 27, 2002  (DE) ................. 102 28 899

(51) Int. Cl.
*G02B 26/08*     (2006.01)
(52) U.S. Cl. .............. 359/196; 359/209; 359/211; 359/226; 359/205; 359/833; 359/834; 359/837
(58) Field of Classification Search .............. None
See application file for complete search history.

(56) References Cited

U.S. PATENT DOCUMENTS

| | | | |
|---|---|---|---|
| 3,746,421 A | 7/1973 | Yoder | |
| 3,881,802 A | 5/1975 | Helava | |
| 4,118,109 A | 10/1978 | Crawford et al. | |
| 5,170,278 A | 12/1992 | Wada et al. | |
| 5,321,259 A * | 6/1994 | Morgan | 250/236 |
| 5,464,972 A | 11/1995 | Massieu et al. | |
| 6,070,813 A | 6/2000 | Durheim | |
| 6,275,626 B1 * | 8/2001 | Laor | 385/18 |
| 6,343,767 B1 | 2/2002 | Sparrold et al. | |

FOREIGN PATENT DOCUMENTS

DE         33 29 040         3/1983

(Continued)

OTHER PUBLICATIONS

Randy J. Sherman, "Polygonal Scanners Applications, Performance, and Design," Laser Beam Scanning, Optical Engineering, v. 8, 1985, pp. 63-75.

(Continued)

*Primary Examiner*—James Phan
(74) *Attorney, Agent, or Firm*—Crowell & Moring LLP

(57) ABSTRACT

A system for the laser beam deflection for optical measuring systems includes an optical element for the deflection of an incident laser beam and a driving unit for generating a rotational movement between the optical element and the incident laser beam in order to deflect the laser beam in different successive directions. The optical element includes at least two segments for the deflection of the incident laser beam by one fixed deflection angle respectively. During the rotational movement, the laser beam successively impinges on the different segments. The optical element has a disk-shaped or ring-shaped design, and the segments are wedge-shaped with inclined surfaces. In the case of a method for the laser beam deflection, a laser beam impinging in an offset manner with respect to the axis of rotation is deflected during a time period by each segment into precisely one defined direction.

16 Claims, 6 Drawing Sheets

FOREIGN PATENT DOCUMENTS

| | | |
|---|---|---|
| DE | 39 39 577 | 6/1991 |
| DE | 196 45 573 | 5/1998 |
| GB | 1238783 | 7/1971 |
| GB | 2 250 884 | 6/1992 |
| GB | 2 256 937 | 12/1992 |
| WO | WO 97/06462 | 2/1997 |
| WO | WO 99/54082 | 10/1999 |

OTHER PUBLICATIONS

*SPIE*, vol. 2956, Feb. 1997, p. 76.
*Applied Optics*, vol. 33, No. 27, p. 6467, 1994.

\* cited by examiner

SYSTEM AND METHOD FOR THE LASER BEAM DEFLECTION FOR OPTICAL MEASURING SYSTEMS

The present application is a continuation of PCT International Application No. DE2003/01893, filed on Jun. 7, 2003, the entire disclosure of which is expressly incorporated by reference herein. The present application claims the benefit of priority of German Application No. 102 28 899.2, filed Jun. 27, 2002, the entire disclosure of which is expressly incorporated by reference herein.

BACKGROUND AND SUMMARY OF THE INVENTION

The invention relates to a system for the laser beam deflection for optical measuring systems.

Measuring systems operating by means of laser beams are used in various fields of technology. A special example of such optimal measuring systems are air data systems which detect and analyze the characteristics of the air at a certain distance in precisely defined measuring directions. For example, the speed of the air movement in all three space axes, the air temperature and the air pressure can be measured thereby, Air data systems can be provided, for example, in an airplane or helicopter, a landcraft, a satellite, or stationary on the ground, Such air data systems are particularly used in aviation For example, in an airplane such air data systems are used to detect turbulences and other important air parameters in time, and initiate corresponding controls.

In order to direct the laser beam in different space directions, for example, scanners are used in the known measuring systems, which scanners guide the laser beam along a circular path.

In the journal *SPIE*, Vol. 2956, February 1997, Page 76, a Doppler LIDAR is described in which the speed components of the air are measured by means of a pulsed laser beam and a scanning mechanism. By means of the scanning mechanism, the beam is guided over various measuring points.

In *Applied Optics*, Vol. 33, No. 27, Page 6467, 1994, a scanner for an air data measuring system is described in which a rotating mirror deflects a laser beam. By way of stationary mirrors, the deflected beam is guided to the outside through a window of the measuring system in order to detect the measuring data.

In British Patent Document GB 1 238 783, a system for the light beam deflection is described in which an incident light beam is deflected in different directions by a rotating disk.

Finally, International Patent Document WO 99/54082 shows a method for deflecting a laser beam for the machining of material in which a wedge-shaped plate is rotating in order to guide a laser beam impinging in the center in a circular path.

In the case of the known laser beam deflection systems for measuring systems, it is problematic that the pulse repetition frequencies are limited in the upward direction. The known systems are suitable only for continuous-wave lasers or for lasers with low pulse repetition rates because the possible pulse frequency depends from the scanning rate. In addition, a synchronizing or triggering of each laser pulse is required. Moreover, the optical losses are to be kept as low as possible, and simultaneously high power densities should be present.

It is an object of the invention to provide a system and a method for the laser beam deflection for optical measuring systems which are suitable for the operation with extremely high-power lasers, such as pulsed lasers with high power and energy densities as well as high pulse repetition rates, and furthermore have low optical losses.

This object is achieved by means of a system for the laser beam deflection for optical measuring systems and by a method for the laser beam deflection in an optical measuring system. Additional advantageous characteristics, aspects and details of the invention are indicated in the dependent claims, the description and the drawings.

The system according to the invention for the laser beam deflection comprises, for example, an,optical element for the deflection of an incident laser beam and a driving unit for generating a rotational movement between the optical element and the incident laser beam in order to deflect the laser beam in different successive directions, the optical element comprising at least two segments for deflecting the incident laser beam by in each case a fixed deflection angle and, during the rotational movement, the laser beam successively impinging on the at least two segments.

The system according to the invention advantageously comprises a rotatable deflection unit which is connected in the beam direction in front of the optical element and is coupled to the driving element in order to move the laser beam before the impinging on the optical element into a circular path with a parallel beam axis. Accordingly, the rotational movement between the optical element and the impinging laser beam is generated by the rotating movement of the deflection unit. The optical element is preferably constructed to be stationary or fixed.

This has the effect that, during a defined time period, exactly the same deflection angle is always supplied in space and no angular movement takes place during this time. In other words, during the time period in which the laser beam impinges on a segment, the direction of the deflected laser beam is constant in space. When the laser beam impinges on the next segment, a change of direction of the deflected laser beam takes place, the new direction in space again being constant, while the laser beam is deflected by the corresponding segment. This is explained by the fact that, when sweeping over a segment, the laser beam always has the same angle of incidence onto the segment surface. The angle of emergence therefore also remains constant in the case of this segment.

As a result, particularly a high pulse rate can be achieved during the measurement, i.e., pulsed lasers can be used with arbitrarily high pulse repetition rates. Thus, extremely high-power lasers, such as pulsed lasers with high power and energy densities, can be used in optical measuring systems. Furthermore, a very high efficiency is achieved since the optical losses by means of the system according to the invention are extremely low. Additionally, a very high accuracy and stability of direction of the deflected laser beam, as well as a considerable temperature independence, is obtained. The system according to the invention can therefore have a very sturdy construction with respect to vibrations, shocks and accelerations. In addition, the system according to the invention is very compact with a low volume, which is particularly advantageous for applications in aviation and space travel.

The system according to the invention can be implemented almost without wear or with a long service life of the bearings, and consists of only a few components, making it particularly cost-effective.

Furthermore, by means of only one laser, several measuring positions, whose number is, for example, between 2 and approximately 100, can be detected almost isochronously. In this case, the scanning frequency of the individual measuring positions can be several hundred hertz. Idle times, during which the unit is interrupted because of switching operations, are avoided.

The optical element is advantageously arranged such that the incident laser beam carries out a circular path during the rotational movement on the surface of the optical element.

The optical element preferably has a disk-shaped or ring-shaped design, and the individual segments of the optical element preferably have a wedge-shaped construction, the wedge angle of each segment defining its deflection angle.

The segments of the optical element advantageously have surfaces which are inclined with respect to the beam axis of the incident laser beam, the angles of inclination of the surface of each segment together with the refractive index of the optical material defining its deflection angle. In particular, during the impinging of the laser beam onto a segment, the deflected laser beam maintains a constant direction in space.

Preferably, the segments are designed such that the incident laser beam is deflected toward the axis of rotation or the axis of symmetry. As a result, the window from which the laser beam emerges in the case of a corresponding optical measuring system, can be kept particularly small. However, it is also conceivable that the segments deflect the incident laser beam away from the axis of rotation.

For example, the segments are designed such that the respective incident laser is deflected into a different defined direction by each segment. However, several segments may also have identical designs in order to, during the rotational movement, deflect the laser beam several times into one and the same defined direction.

A transition area advantageously exists between the two adjoining segments, The transition are permits a change of direction of the laser beam without any beam interruption. As a result, a fading-over from one measuring point or one measuring direction to another measuring point or another measuring direction can take place during the measuring.

It is particularly advantageous for the optical element to have a spherical or aspherical construction on one side, for example, on the rear side, or to have a spherically or aspherically constructed surface element with a positive focal length. As a result, a displacement of the laser beam incident on the optical element during the circular-path movement of the laser beam at a desired measuring point can be corrected, so that the measuring position can be maintained particularly precisely.

The optical element is preferably flattened or constructed as a plane surface in a partial area which is not utilized for the beam deflection, or it has a recess in the partial area. As a result, a further weight reduction and miniaturization of the system can be achieved.

The optical element is preferably transparent, the respective deflection angle being generated by optical refraction in segments. However, it is also conceivable to develop the optical element in a reflecting manner, the respective deflection angle being generated by reflection on the segments or segment surfaces.

The dwell time of the deflected laser beam in a defined space direction can be determined as a function of the angular range of the respective segment and of the rotation frequency. This results in a particularly high flexibility with respect to the manner of measuring.

The segments preferably have a spherical or aspherical surface on one side. As a result a correction of a parallel beam displacement can be achieved.

The segments are preferably designed such that the beam deflection takes place toward the axis of rotation. The outlet hole for the laser beam can therefore be kept particularly small.

Advantageously, the optical element according to the invention is provided or can be used in a system for the laser beam deflection according to the invention. Advantages and characteristics of the optical element according to the invention also apply to the laser beam deflection system according to the invention.

According to another aspect of the invention, a method is disclosed for the laser beam deflection, by which an incident laser beam is successively deflected in at least two different directions by an optical element, in which case a deflecting unit rotates which is connected in front, and the laser beam impinging in a displaced manner with respect to the axis of rotation during a rotation in each case for a time period t impinges on at least two segments of the optical element, and each segment deflects the laser beam during the time period t into exactly one defined direction.

By means of the method according to the invention, particularly extremely high-power lasers or pulsed lasers with arbitrarily high pulse repetition rates can be used in optical measuring systems, and the scanning frequency of the individual measuring positions can, for example, amount to several hundred hertz. In addition, the advantages and characteristics which are indicated with respect to the system according to the invention and to the optical element according to the invention also apply to the method according to the invention.

Advantageously, the method is implemented by means of a system according to the invention.

In the following, the invention will be described as an example by means of the figures.

BRIEF DESCRIPTION OF THE DRAWING FIGURES

DETAILED DESCRIPTION

Figure 1:
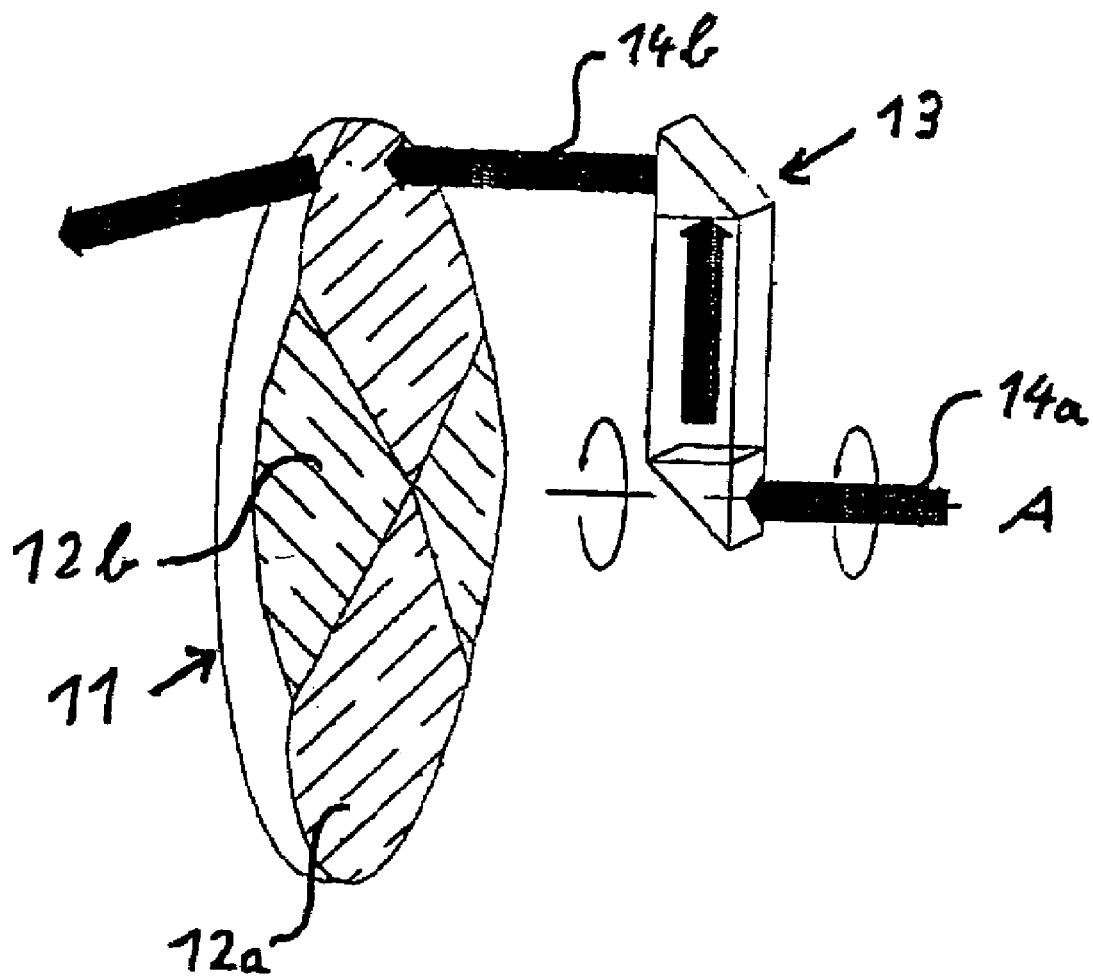
FIG. 1 is a schematic perspective view of a laser beam deflection system according to a preferred embodiment of the invention.

FIG. 1 illustrates a laser deflection unit or system 10 according to the invention for the laser beam deflection for optical measuring systems according to a preferred embodiment of the invention. The system 10 comprises an optical element 11 with several segments 12a, 12b, which have a wedge-shaped design. The optical element 11 is further developed in the shape of a round disk, the individual segments 12a, 12b of the disk having surfaces inclined in the radial direction.

A deflection unit 13, in the form of a rotatable lens system, is connected in front of the stationary optical element 11 and has the purpose of laterally offsetting a laser beam 14a and to cause the offset laser beam 14b to carry out a circular movement, the beam axis being oriented parallel to the original beam axis. Thus, the laterally offset laser beam 14a, after passing through the rotating deflection unit 13, describes the lateral surface of a cylinder or a circular movement in a cylinder shape. The shape of the optical element 11, which may, for example, also be developed as a ring-shaped disk cutout and is preferably divided on its front side or beam entry side into the individual segments 12a, 12b, is wedge-shaped in the lateral sectional view for each of these segments 12a, 12b. In this case, each segment 12a, 12b has its own wedge angle with a separate alignment.

Figure 2:
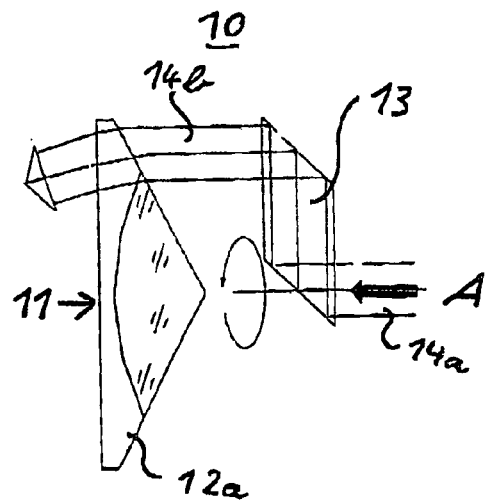
FIG. 2 is a schematic sectional view of the system illustrated in FIG. 1.

FIG. 2 illustrates the system 10 according to the invention in a lateral sectional view. The wedge shape of the individual segments 12a, 12b has the effect that the incident laser beam 14b which impinges on the optical element 11 in each case within a segment, is broken on the surfaces of the wedge-shaped segments 12a, 12b successively into the different desired directions. Each direction of the laser beam caused by an individual segment 12a, 12b is exactly maintained when the incident laser beam 14b migrates over a segment surface. In this embodiment, the individual wedges or segments 12a, 12b are prisms.

The deflection unit 13, which is rotatingly disposed and is caused to rotate by means of a driving unit not shown in the figures, contains mirrors for the beam deflection, for example, of a metallic or dielectric type, as deflection surfaces, on which the laser beam 14a is laterally offset by reflection. However, prisms can also be used by using the total reflection at the deflection surfaces. When prisms are used, the rotating lens system or deflection unit 13 can also be constructed as a transparent monolith.

After passing through the deflection unit 13 rotating in the operation, the cylindrically rotating laser beam 14b impinges on the stationary, optically transparent, optical element 11, whose special shape breaks the laser beam into the desired direction.

FIGS. 3a–3d illustrate frontal views of the optical element 11 in different embodiments.

Figure 3A:
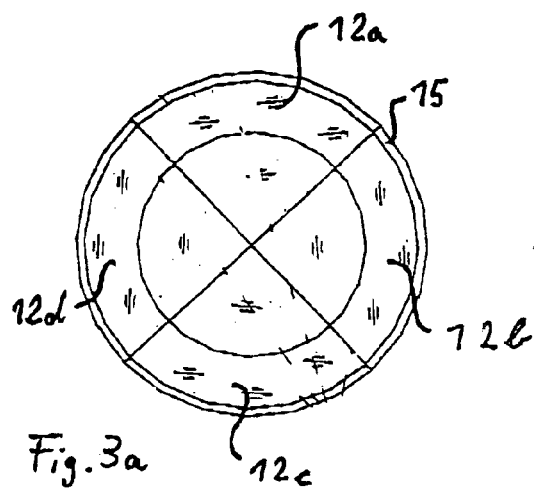
FIGS. 3a–3d are schematic front views of optical elements according to the invention of different preferred embodiments.

In FIG. 3a, the optical element 11 constructed as a round disk which contains a surface on its beam inlet side or front side or rear side. The surface is divided into four partial segments 12a, 12b, 12c, 12d. The laser beam 14b impinging essentially perpendicularly on the front side of the optical element 11 describes a circular path 15 in the edge area of the optical element 11, the incident laser beam 14b successively impinging on the individual segments 12a, 12b, 12c, 12d and being deflected by these into different directions in space. In this case, each segment 12a, 12b, 12c, 12d has a fixed deflection angle in space, so that the deflected laser beam 14c remains constant during a time period t in its space direction, i.e., as long as the incident laser beam 14b is deflected by the corresponding segment.

Figure 3B:
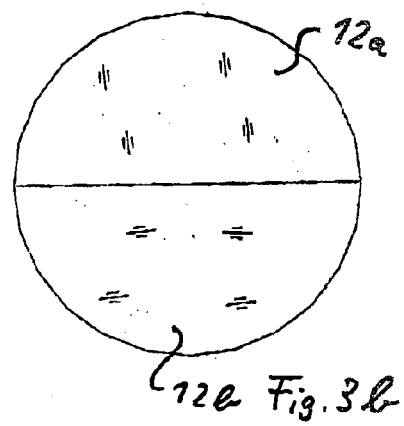
Figure 3C:
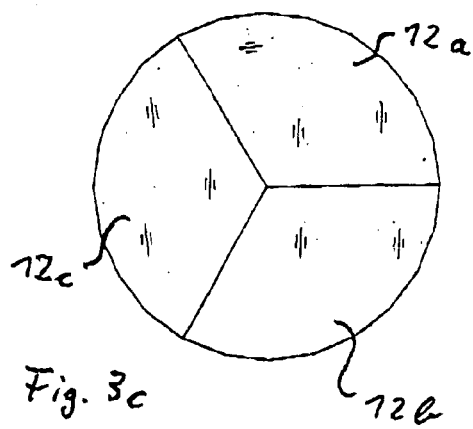

In FIG. 3b, the optical element 11 is evenly divided into two partial segments 12a, 12b, while, in FIG. 3c, it is evenly divided into three partial segments 12a, 12b, 12c.

Figure 3D:
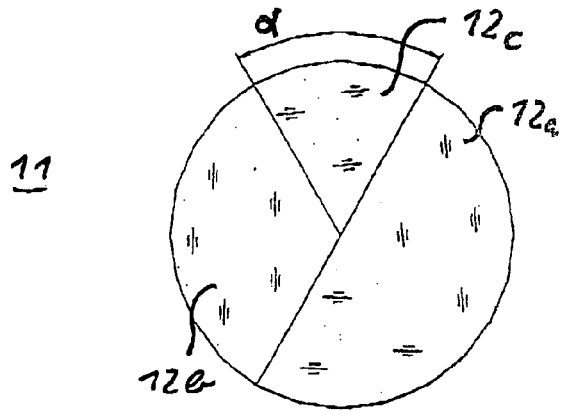

FIG. 3d illustrates the optical element 11 with a subdivision into segments 12a, 12b, 12c which each take up a different angular area of the optical element 11. As a result, while the circular or rotational speed is constant, a different dwell time of the deflected laser beam in the individual measuring positions is achieved. The segment angle α of a segment 12a, 12b, 12c, 12d, together with the rotation frequency F in hertz, defines the dwell time or measuring time $T_m$ in seconds per direction. The following applies in this case:

$$T_m = \frac{\alpha}{(360° * F.)} \quad (1)$$

The switching-over from one deflection direction to the next does not take place spontaneously but corresponds to a fading-over. The fade-over duration $T_ü$ depends on the laser beam diameter $D_L$, on the rotation frequency F in hertz and on the diameter of the circular path $D_K$ which the laser beam 14b describes on the optical element 11. Here, approximately the following relationship applies:

$$T_0 = \frac{D_L}{(D_K * \pi * F)} \quad (2)$$

The number of disk or ring segments determines the number of measuring positions of the optical measuring device in which the laser deflection system is used. For example, in the case of two positions, at least two segments should be formed, in the case of three positions, at least three, etc.

The deflection angle of each segment 12a, 12b, 12c, 12d depends only on the wedge angle or the inclination of the wedge-shaped segment. As a result, the accuracy of the deflection angle is determined only by manufacturing tolerances and acts in a stable manner with respect to time. During the implementation, an angle variation of the rotating elements, which may exist because of a bearing play, can be kept negligibly small as a result of the suitable selection of bearings.

Figure 4:
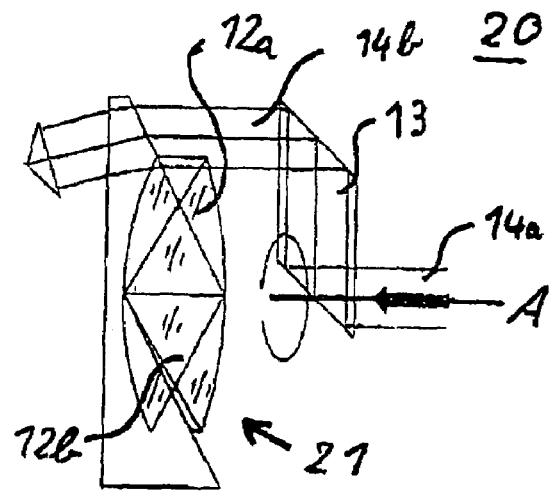
FIG. 4 is a schematic lateral view of the system according to the invention according to another preferred embodiment.
Figure 5:
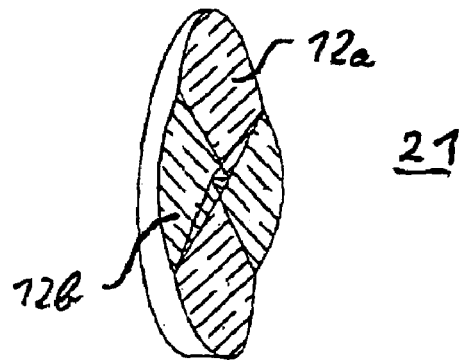
FIG. 5 is a schematic perspective view of the optical element used in FIG. 4.

FIG. 4 illustrates a system for the beam deflection 20 according to another preferred embodiment of the invention, having an optical element 21, in which several segments 12a, 12b cause a deflection in the same direction. FIG. 5 is a schematic perspective view of the optical element 21. In this embodiment, a double deflecting of the laser beam takes place in the same direction during a rotation.

Figure 6:
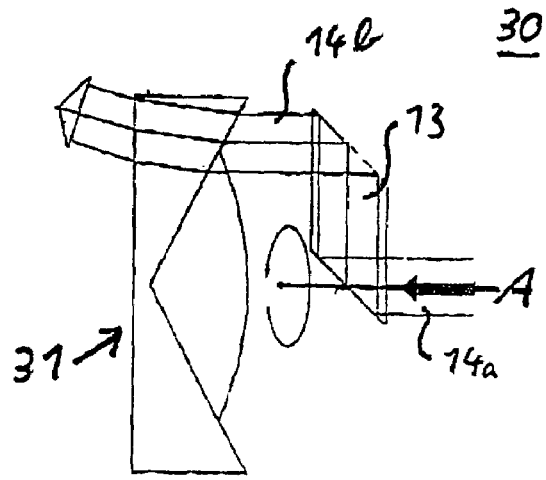
FIG. 6 is a schematic lateral view of another embodiment of the laser beam deflection system according to the invention, in which the laser beam is deflected away from the axis of symmetry.

FIG. 6 illustrates another embodiment of the invention having a system for the beam deflection 30 whose optical element 31 causes a beam deflection away from the axis of symmetry or rotation A. However, in contrast, the beam deflection toward the axis of rotation A illustrated in the preceding figures has the advantage that the space utilized for the laser irradiation in the beam path behind the lens system can be kept smaller in order to permit, for example, a smaller optical outlet hole. This is particularly advantageous in vehicles or airplanes.

As a result of the wedge shape of the individual segments 12a, 12b, 12c, 12d, the laser beam passes through different thicknesses of the respective segment. This leads to a lateral displacement of the deflected laser beam, the displacement corresponding approximately to the segment width at the location of the circular movement. In the case of this displacement, the deflected laser beam remains parallel.

Figure 7:
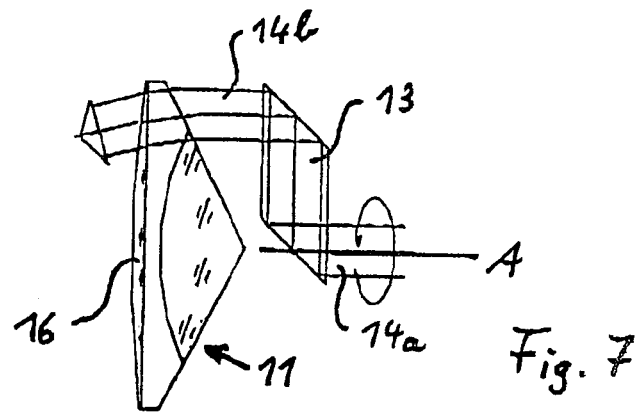
FIG. 7 is a schematic lateral view of a particularly preferred embodiment of the system according to the invention with a curved surface element.
Figures 8A, 8B:
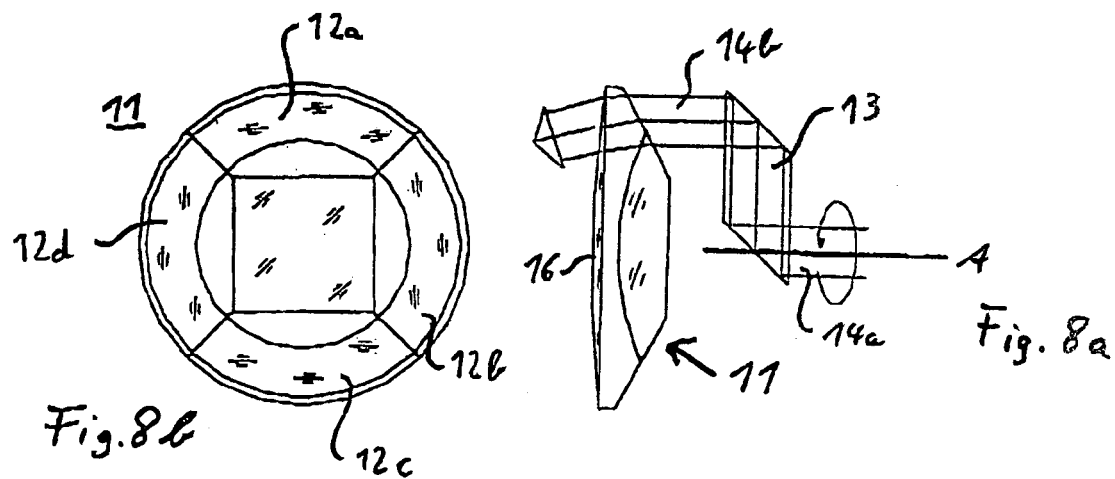
FIGS. 8a and 8b are schematic views of a further preferred embodiment with a flattened optical element.
Figures 9A, 9B:
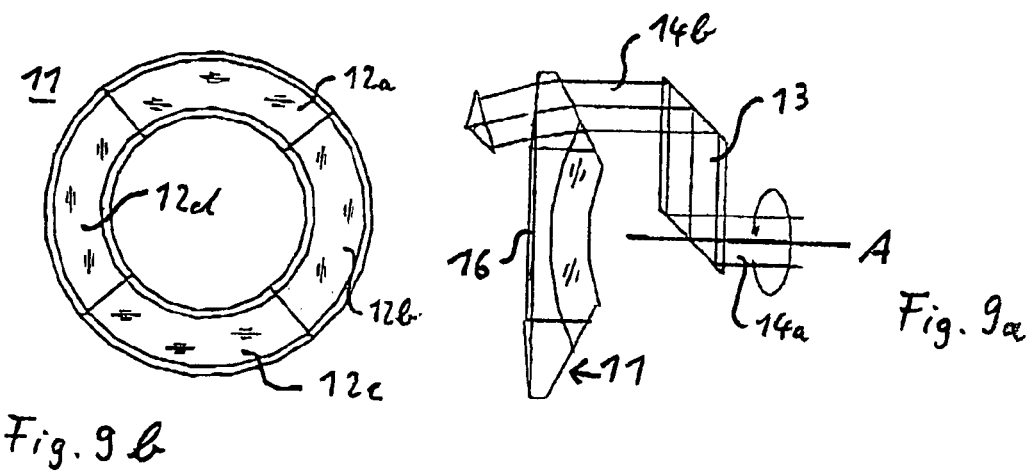
FIGS. 9a and 9b are views of a further preferred embodiment of the invention with an optical element recessed on one side.

FIGS. 7, 8a and 9a illustrate additional embodiments in which the lateral displacement is corrected if it has a disturbing effect in the event of a high demand with respect to the precise position of the desired measuring point. In this case, one side of the optical element 11, in the case shown here, the back side or beam outlet side, is constructed as a spherical or aspherical surface. For this purpose, a spherically or aspherically constructed surface element 16 is situated on the rear side of the optical element 11. In order to achieve an exact correction of the displacement, the radius of this sphere or asphere forms a positive focal length which corresponds precisely to the distance from the measuring position. Since all parallel beams are bundled in this focal point, the displacement errors are thereby also corrected.

In the embodiments illustrated in FIGS. 8a, 8b, 9a, 9b, the central area of the optical element 11 is flattened (FIGS. 8a, 8b) or recessed (FIGS. 9a, 9b). As a result, a further weight reduction and miniaturization of the system is achieved. The flattening or recessing can be achieved because only the area penetrated by the laser beam has to have the wedge-shaped or spherical or aspherical shape.

Figure 10:
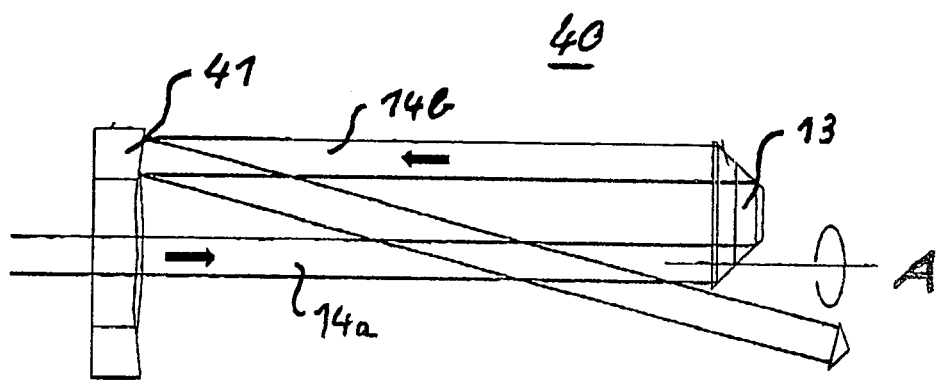
FIG. 10 is a schematic lateral view of a system according to the invention with a reflecting optical element.
Figure 11:
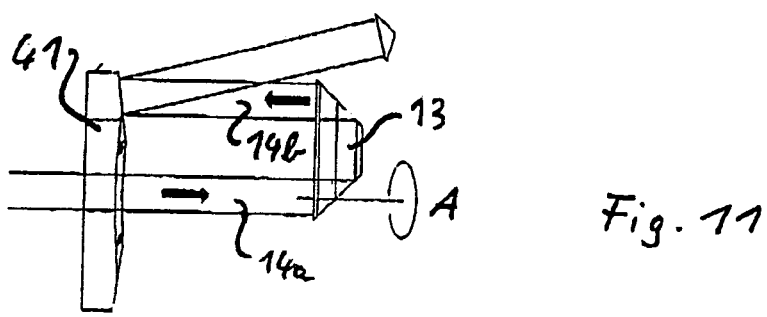
FIG. 11 is a schematic lateral view of a system according to the invention with a reflecting optical element and a beam deflection away from the axis of symmetry.

FIGS. 10 and 11 illustrate a system 40 as an additional possible embodiment of the invention, having an optical element 41 which reflects the incident laser beam 14b. For this purpose, the individual segments of the optical element 41 have reflective surfaces with a reflection degree as high as possible for laser wave lengths on the side facing the incident laser beam. As in the above-described embodiments, here also a deflection of the laser beam can take place toward the axis of symmetry or rotation A (FIG. 10), or a reflection can take place away from the axis of symmetry or rotation A (FIG. 11), or both can be combined by suitable segments.

Figure 12:
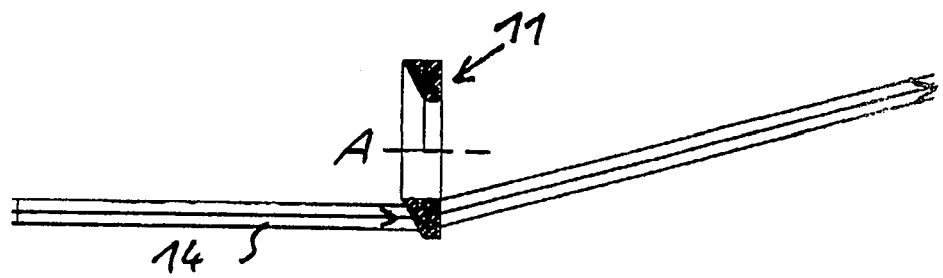
FIG. 12 is a schematic sectional view of a laser beam deflection system with an optical element.

In the embodiment illustrated in FIG. 12, the surface shape of the optical element 11 has a more complex construction; that is, it is no longer constructed only wedge-shaped with plane surfaces, but, depending on the deflection direction, has a spherical, aspherical, for example, also parabolic, elliptic or helical construction. A possibly existing and possibly interfering beam deformation by such curved surfaces has no disturbing effect, particularly when applied at a short distance and at relatively small deflection angles or small bema diameters. This embodiment is preferably used in cases in which only deflection directions of one space axis, that is, horizontal or vertical, are required which set a plane.

Similar to the above described embodiments, here also, a deflection can take place by reflection on the optical element 11. This means that the lens system for the deflection in this case is not transparent but metal-coated.

Figure 13:
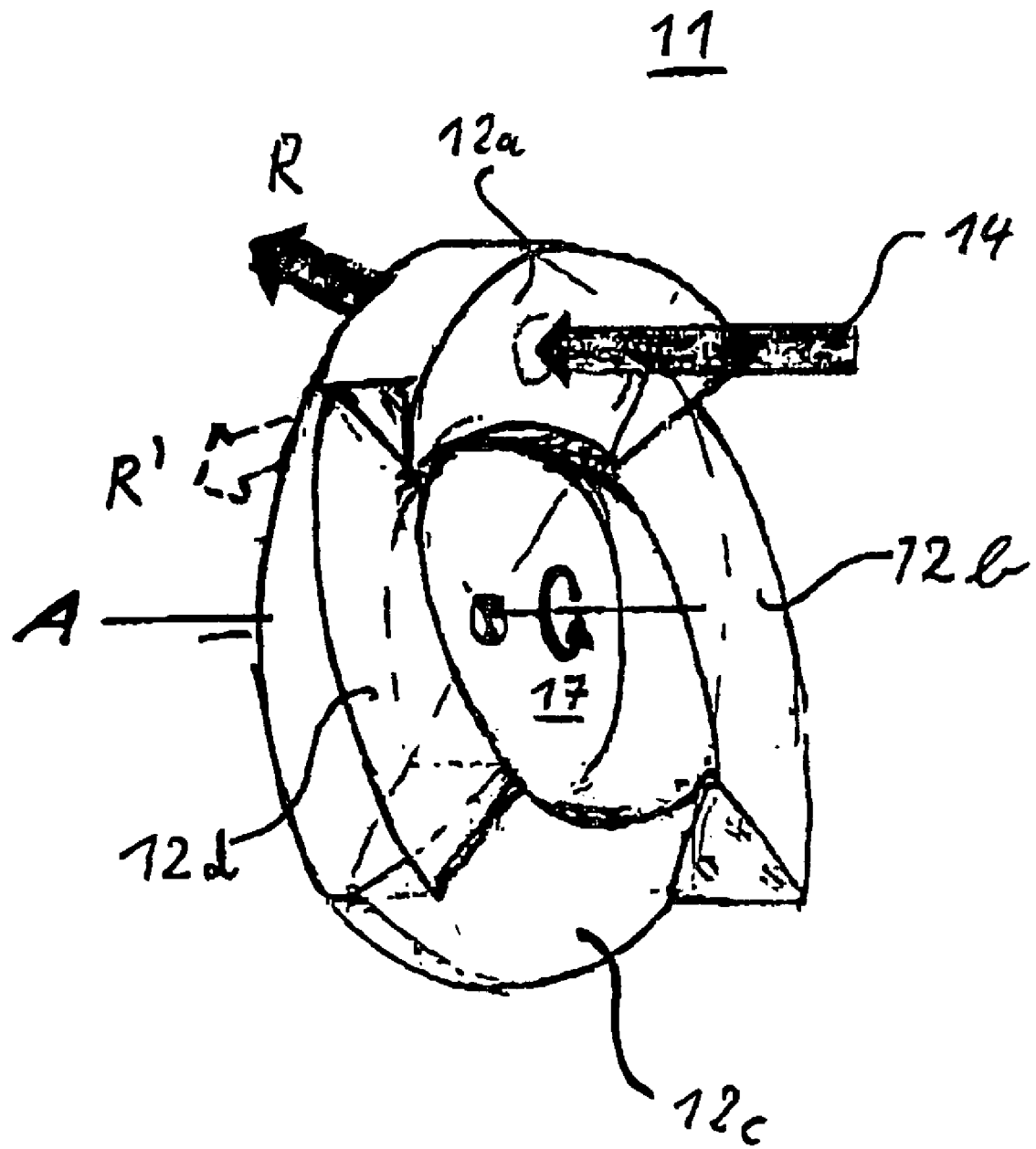
FIG. 13 is a schematic perspective view of an optical element according to a particularly preferred embodiment of the invention.

FIG. 13 shows the optical element 11 which, for the deflection of the incident laser beam 14, has helically or conically shaped out segments 12a, 12b, 12c, 12d, The optical element 11 has a ring-shaped design, in which case the individual segments 12a, 12b, 12c, 12d, which are developed as cones or helixes, are constructed in the area of the circular path of the impinging laser beam 14. In its central area 17, the optical element 11 has a recess for reducing weight.

The side of each segment 12a, 12b, 12c, 12d facing the impinging laser beam is inclined in the circumferential direction, in which case the surface of each segment 12a, 12b, 12c, 12d rises constantly in a circumferential direction. While the incident laser beam 14 sweeps over one of the segments 12a, it is constantly deflected by this segment in a direction R, When impinging onto the segment 12b, which follows, a change of direction of the deflected laser beam takes place in the direction R'. This direction R', in turn, remains constant until, because of the rotational movement, the laser beam impinges on the next segment 12c, etc.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A system for the laser beam deflection for optical measuring systems, comprising:
    an optical element, which deflects an incident laser beam;
    a driving unit which generates a rotational movement between the optical element and the incident laser beam to deflect the laser beam in different successive directions, wherein the optical element comprises at least two segments which deflect the incident laser beam by, in each case, a fixed deflection angle, and the laser beam during the rotational movement, successively impinges on the at least two segments; and
    a rotatable deflection unit, which is located in front of the optical element in the beam direction and is coupled to the driving unit in order to laterally offset the laser beam before impinging on the optical element and cause it to carry out a circular movement, the beam axis being oriented parallel to the original beam axis.

2. The system according to claim 1, wherein the optical element is arranged such that the incident laser beam on the surface of the optical element carries out a circular path during the rotational movement.

3. The system according to claim 1, wherein the optical element has a disk-shaped or ring-shaped design.

4. The system according to claim 1, wherein the segments of the optical element have plane surfaces which are inclined with respect to the beam axis of the incident laser beam, the angle of inclination of each segment defining its deflection angle.

5. The system according to claim 1, wherein during the impinging of the laser beam on a segment, the deflected laser beam maintains a constant direction.

6. The system according to claim 1, wherein the segments are designed such that the incident laser beam is deflected toward the axis of rotation.

7. The system according to claim 1, wherein the segments are designed such that the respective incident laser beam is deflected by each segment into a different defined direction.

8. The system according to claim 1, wherein several segments have the same design in order to deflect the laser beam several times into one and the same defined direction during the rotational movement.

9. The system according to claim 1, wherein a transition area exists between two adjacent segments, which transition area permits a change of direction of the laser beam without interrupting the beaming.

10. The system according to claim 1, wherein, on one side, the optical element has a spherically or aspherically constructed surface element with a positive focal length.

11. The system according to claim 1, wherein the optical element is flattened or has a recess in a partial area not utilized for the beam deflection.

12. The system according to claims 1, wherein the optical element is transparent, the respective deflection angle being generated by optical refraction in the segments.

13. The system according to claim 1, wherein the optical element is reflecting, the respective deflection angle being generated by reflection on the segments.

14. The system according to claim 1, wherein a dwell time of the deflected laser beam in a defined space direction is defined as a function of the angular area of the respective segment and of the rotation frequency.

15. A method for the laser beam deflection in optical measuring systems, the method comprising the steps of:
deflecting an incident laser beam by an optical element successively in at least two different directions;
impinging the laser beam, in each case, for a time period on at least two segments of the optical element;
deflecting, by each segment, the laser beam during the time period in precisely one defined direction, wherein before the impinging on the optical element the laser beam is laterally offset by a rotating deflection unit and carries out a circular path, the beam axis being oriented parallel to the original beam axis.

16. The method according to claim 15, wherein it is implemented by means of a system according to claim 1.

* * * * *